(12) United States Patent
Shine et al.

(10) Patent No.: US 10,538,249 B2
(45) Date of Patent: Jan. 21, 2020

(54) VEHICLE CONTROL APPARATUS

(71) Applicant: TOYOTA JIDOSHA KABUSHIKI KAISHA, Toyota-shi, Aichi (JP)

(72) Inventors: Kazumi Shine, Toyota (JP); Kazuhiko Yamada, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 15/959,834

(22) Filed: Apr. 23, 2018

(65) Prior Publication Data

US 2018/0326987 A1 Nov. 15, 2018

(30) Foreign Application Priority Data

May 12, 2017 (JP) ................................. 2017-095981

(51) Int. Cl.
*B60W 30/18* (2012.01)
*B60W 30/188* (2012.01)
*B60W 50/08* (2012.01)
*B60W 50/14* (2012.01)

(52) U.S. Cl.
CPC ...... *B60W 30/1884* (2013.01); *B60W 50/087* (2013.01); *B60W 50/14* (2013.01); *B60W 2520/10* (2013.01); *B60W 2540/00* (2013.01); *B60W 2550/142* (2013.01); *B60W 2710/0677* (2013.01)

(58) Field of Classification Search
None
See application file for complete search history.

(56) References Cited

U.S. PATENT DOCUMENTS 8,690,729 B2 * 4/2014 Gwon ................... B60W 10/06
477/94

FOREIGN PATENT DOCUMENTS

JP 2003-166643 A 6/2003

* cited by examiner

*Primary Examiner* — Dirk Wright
(74) *Attorney, Agent, or Firm* — Oliff PLC

(57) ABSTRACT

A control apparatus for a vehicle provided with (a) a transmission and (b) a shifting device including (b-1) a shift actuator and (b-2) a shift lever. The shift actuator establishes one of shift ranges in the transmission such that the established one of the shift ranges corresponds to a selected one of shift-lever operating positions of the shift lever. When a switching request is made to request the transmission to be switched to an opposite-direction drive range that is for driving the vehicle in a direction opposite to a current running direction of the vehicle, during running of the vehicle with a speed being not lower than a given value, the control apparatus rejects the switching request. The control apparatus rejects the switching request, also during running of the vehicle with the running speed being lower than the given value, if the vehicle is running on a downhill road.

7 Claims, 9 Drawing Sheets

|  | C1 | C2 | B1 | B2 | B3 | F1 |
|---|---|---|---|---|---|---|
| 1ST | ○ |  |  | □ |  | △ |
| 2ND | ○ |  | ○ |  |  |  |
| 3RD | ○ |  |  |  | ○ |  |
| 4TH | ○ | ○ |  |  |  |  |
| 5TH |  | ○ |  |  | ○ |  |
| 6TH |  | ○ | ○ |  |  |  |
| R |  |  |  | ○ | ○ |  |
| N |  |  |  |  |  |  |

□ : ENGAGED FOR ENGINE BRAKE APPLICATION
△ : ENGAGED FOR VEHICLE DRIVING

VEHICLE CONTROL APPARATUS

This application claims priority from Japanese Patent Application No. 2017-095981 filed on May 12, 2017, the disclosure of which is herein incorporated by reference in its entirety.

FIELD OF THE INVENTION

The present invention relates to a technique for restraining an engine stall even when a drive range for driving in a direction opposite to a current running direction is selected by a vehicle operator during running on a downhill road.

BACKGROUND OF THE INVENTION

There is well known an automatic transmission with a plurality of shift ranges in which switching from a forward drive range as one of the shift ranges to a reverse drive range as one of the shift ranges is inhibited during a forward running. For example, JP-2003-166643A discloses a vehicle control apparatus configured to inhibit switching from the forward drive range to the reverse drive range by operation of an operator of a vehicle when the vehicle runs at a speed not lower than a given value, and to allow the switching from the forward drive range to the reverse drive range when the vehicle runs at a low speed, for thereby avoiding shock caused by a sudden change of running speed of the vehicle in the event of an erroneous shift range switching by the vehicle operator, while assuring operational convenience, for example, in a so-called "going back and forth" by allowing the switching during running at a low speed.

SUMMARY OF THE INVENTION

However, even at a low running speed of a vehicle at which an engine stop (i.e., an engine stall) does not occur on a flat road, when the switching between the forward drive range and the reverse drive range is made on a downhill road, a larger inertia of the vehicle is generated, as compared with on a flat road, so that a larger torque inputted to the engine is generated on the downhill road whereby an engine stall could occur. The occurrence of the engine stall causes a vacuum pressure in an intake of the engine to be reduced, and accordingly reduces a force which is generated by a brake booster using the vacuum pressure and which assists a brake pedal force (i.e., force applied to depress a brake pedal of the vehicle), thereby resulting in a situation in which the vehicle cannot be stopped easily. Further, in an arrangement in which the above-described given value is reduced for inhibiting the shift range switching even at a lower running speed of the vehicle for preventing the engine stall also on a downhill road, there is a risk that the operational convenience is impaired, for example, in "going back and forth", because of more limitation on the shift range switching between the forward drive range and the reverse drive range even on a flat road.

The present invention was made in view of the background art described above. It is therefore an object of the present invention to provide a vehicle control apparatus for restraining the engine stall on a downhill road so as to avoid a situation in which the vehicle cannot be easily stopped due to interruption of the brake booster assisting a brake pedal force on the downhill road, without impairing operational convenience on a flat road, for example, in "going back and forth" that requires the shift range switching between the forward drive range and the reverse drive range.

The object indicated above is achieved according to the following modes of the present invention:

According to a first mode of the invention, there is provided a control apparatus for a vehicle that includes (a) an automatic transmission having a plurality of shift ranges and (b) a shifting device including (b-1) a shift actuator and (b-2) a shift lever, wherein the shift actuator is configured to establish one of the shift ranges in the automatic transmission such that the established one of the shift ranges corresponds to a selected one of a plurality of shift-lever operating positions of the shift lever. When a switching request is made by an operator of the vehicle to request the automatic transmission to be switched to an opposite-direction drive range as one of the shift ranges which is for driving the vehicle in a direction opposite to a current running direction of the vehicle, during running of the vehicle with a running speed being not lower than a given value, the control apparatus is configured to reject the switching request requesting the automatic transmission to be switched to the opposite-direction drive range. The control apparatus is configured to reject the switching request requesting the automatic transmission to be switched to the opposite-direction drive range, also during running of the vehicle with the running speed being lower than the given value, if the vehicle is running on a downhill road. It is noted that the term "downhill road" is interpreted to mean a road that is downhill in the current running direction. In this sense, the expression "the vehicle is running on a downhill road" may be interpreted to mean that the vehicle is running in a direction containing a component of a downward direction (in which gravity acts) rather than an upward direction. It is further noted that the above-described switching request requesting the automatic transmission to be switched to the opposite-direction drive range is made by selection of one of the plurality of shift-lever operating positions of the shift lever by the operator, which corresponds to the opposite-direction drive range, and the control apparatus may be configured to inhibit the shift actuator from establishing the opposite-direction drive range in the automatic transmission, when rejecting the switching request requesting the automatic transmission to be switched to the opposite-direction drive range. Further, the vehicle may further include: a vehicle speed sensor configured to detect the running speed of the vehicle; and a slope sensor configured to detect a slope of a road on which the vehicle is currently running, and the control apparatus may include: (a) a vehicle speed determiner configured to determine whether the running speed detected by the vehicle speed sensor is not lower than the given value and to determine the current running direction of the vehicle; (b) a road slope determiner configured to determine whether the road is downhill with an absolute value of the slope being not smaller than a predetermined value, based on the current running direction determined by the vehicle speed determiner and the slope detected by the slope sensor; (c) an opposite-direction drive range determiner configured, when the switching request is made by the operator, to determine whether the switching request requests the automatic transmission to be switched to the opposite-direction drive range; and (d) a shift-range switching determiner configured to reject the switching request (i) when it is determined by the opposite-direction drive range determiner and the vehicle speed determiner that the switching request requests the automatic transmission to be switched to the opposite-direction drive range and that the running speed is not lower than the given value, and (ii) when it is determined by the opposite-direction drive range determiner and the road slope determiner that the switching request requests the automatic transmission to be switched to the opposite-direction drive range and that the road is downhill with the absolute value of the slope being not smaller than the predetermined value.

According to a second mode of the invention, in the control apparatus according to the first mode of the invention, the plurality of shift ranges of the automatic transmission includes at least a forward drive range, a reverse drive range and a neutral range, and when rejecting the switching request requesting the automatic transmission to be switched to the opposite-direction drive range from one of the forward drive range and the reverse drive range, which is established for running the vehicle in the current running direction, the control apparatus is configured to cause the shift actuator to maintain the one of the forward drive range and the reverse drive range, or to cause the shift actuator to establish the neutral range.

According to a third mode of the invention, in the control apparatus according to the first or second mode of the invention, the plurality of shift ranges of the automatic transmission includes at least a neutral range and a parking range, and when rejecting the switching request requesting the automatic transmission to be switched to the opposite-direction drive range from the neutral range that is established for running the vehicle in the current running direction, the control apparatus is configured to cause the shift actuator to maintain the neutral range, or to cause the shift actuator to establish the parking range.

According to a fourth mode of the invention, in the control apparatus according to the second mode of the invention, after rejecting the switching request requesting the automatic transmission to be switched to the opposite-direction drive range during running of the vehicle on the downhill road with the running speed being lower than the given value, the control apparatus is configured to inform the operator of the vehicle that (i) there is a possibility of an engine stall of the vehicle if the automatic transmission is switched to the opposite-direction drive range, and that (ii) the automatic transmission is allowed to be switched to the opposite-direction drive range after the vehicle is stopped.

According to a fifth mode of the invention, in the control apparatus according to the third mode of the invention, after rejecting the switching request requesting the automatic transmission to be switched to the opposite-direction drive range during running of the vehicle on the downhill road with the running speed being lower than the given value, the control apparatus is configured to allow the switching request if the switching request is made again by the operator, and to inform that (i) there is a possibility of an engine stall of the vehicle if the automatic transmission is switched to the opposite-direction drive range, and that (ii) the automatic transmission is allowed to be switched to the opposite-direction drive range if the switching request is made again by the operator.

According to the first mode of the invention, when the switching request is made by the operator to request the automatic transmission to be switched to the opposite-direction drive range for driving the vehicle in a direction opposite to a current running direction of the vehicle during running of the vehicle at a speed not lower than the given value, the control apparatus is configured to reject the switching request requesting the automatic transmission to be switched to the opposite-direction drive range. The control apparatus is configured, during running of the vehicle on a downhill road, to reject the switching request requesting the automatic transmission to be switched to the opposite-direction drive range even if the running speed of the vehicle is lower than the given value, whereby occurrence of an engine stall can be retrained. Thus, it is possible to avoid a situation in which the vehicle cannot be stopped easily, due to reduction of a vacuum pressure in an intake of the engine by stop of the engine, which reduction leads to reduction of a force which is generated by a brake booster using the vacuum pressure and which assists a brake pedal force. Further, in an arrangement in which the above-described given value is reduced for inhibiting the shift range switching even at a lower running speed of the vehicle for preventing the engine stall also on a downhill road, the operational convenience is likely to be impaired, for example, in "going back and forth", because of more limitation on the shift range switching between the forward drive range and the reverse drive range even on a flat road. However, in the present invention, it is possible to avoid the operational convenience from being impaired.

According to the second mode of the invention, when rejecting the switching request requesting the automatic transmission to be switched to the opposite-direction drive range from one of the forward drive range and the reverse drive range, which is established for running the vehicle in the current running direction, the control apparatus is configured to cause the shift actuator to maintain the one of the forward drive range and the reverse drive range, or to cause the shift actuator to establish the neutral range, so that it is possible to avoid occurrence of the engine stall and accordingly to stop the vehicle easily. Thus, it is possible to avoid a situation in which the vehicle cannot be stopped easily, due to reduction of a vacuum pressure in an intake of the engine by stop of the engine, which reduction leads to reduction of a force which is generated by a brake booster using the vacuum pressure and which assists a brake pedal force. Further, it is possible to avoid the operational convenience from being impaired, unlike in an arrangement in which the above-described given value is reduced for inhibiting the shift range switching even at a lower running speed of the vehicle for preventing the engine stall also on a downhill road, and in which the operational convenience is likely to be impaired, for example, in "going back and forth", because of more limitation on the shift range switching between the forward drive range and the reverse drive range even on a flat road.

According to the third mode of the invention, when rejecting the switching request requesting the automatic transmission to be switched to the opposite-direction drive range from the neutral range that is established for running the vehicle in the current running direction, the control apparatus is configured to cause the shift actuator to maintain the neutral range, or to cause the shift actuator to establish the parking range, so that it is possible to avoid occurrence of the engine stall and accordingly to stop the vehicle easily. Thus, it is possible to avoid a situation in which the vehicle cannot be stopped easily, due to reduction of a vacuum pressure in an intake of the engine by stop of the engine, which reduction leads to reduction of a force which is generated by a brake booster using the vacuum pressure and which assists a brake pedal force. Further, it is possible to avoid the operational convenience from being impaired, unlike in an arrangement in which the above-described given value is reduced for inhibiting the shift range switching even at a lower running speed of the vehicle for preventing the engine stall also on a downhill road, and in which the operational convenience is likely to be impaired, for example, in "going back and forth", because of more limitation on the shift range switching between the forward drive range and the reverse drive range even on a flat road.

According to the fourth mode of the invention, after rejecting the switching request requesting the automatic transmission to be switched to the opposite-direction drive range during running of the vehicle on the downhill road with the running speed being lower than the given value, the control apparatus is configured to inform the operator of the vehicle that (i) there is a possibility of an engine stall of the vehicle if the automatic transmission is switched to the opposite-direction drive range, and that (ii) the automatic transmission is allowed to be switched to the opposite-direction drive range after the vehicle is stopped. Thus, it is possible to avoid occurrence of the engine stall, and accordingly to stop the vehicle easily by ensuring the force which is generated by the brake booster and which assists the brake pedal force. Further, in a case when the operator's selection of the opposite-direction drive range is made by an erroneous operation, it is possible to facilitate the operator to take appropriate measures.

According to the fifth mode of the invention, after rejecting the switching request requesting the automatic transmission to be switched to the opposite-direction drive range during running of the vehicle on the downhill road with the running speed being lower than the given value, the control apparatus is configured to allow the switching request if the switching request is made again by the operator, and to inform that (i) there is a possibility of an engine stall of the vehicle if the automatic transmission is switched to the opposite-direction drive range, and that (ii) the automatic transmission is allowed to be switched to the opposite-direction drive range if the switching request is made again by the operator. Thus, it is possible to avoid occurrence of the engine stall, and accordingly to stop the vehicle easily by ensuring the force which is generated by the brake booster and which assists the brake pedal force. Further, in a case when the operator's selection of the opposite-direction drive range is made by an erroneous operation, it is possible to facilitate the operator to take appropriate measures.

DETAILED DESCRIPTION OF PREFERRED EMBODIMENTS

Hereinafter, some embodiments of the invention will be described in detail with reference to the accompanying drawings. The figures of the drawings are simplified or deformed as needed and portions are not necessarily precisely depicted in terms of dimension ratio, shape, etc.

First Embodiment

Figures 1, 2:
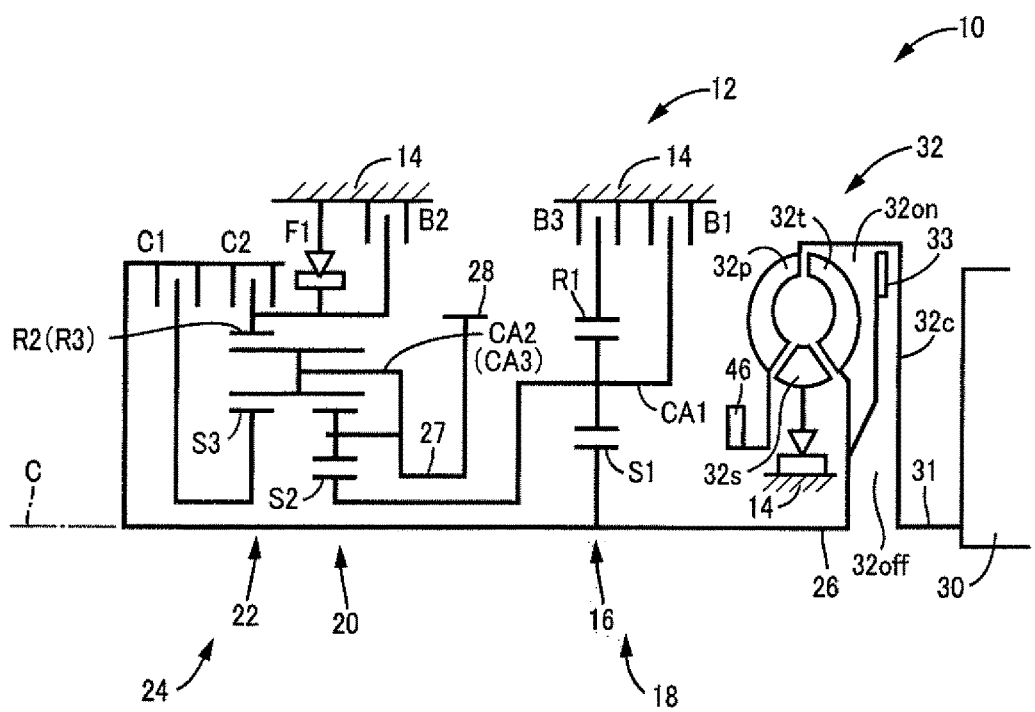
FIG. 1 is a schematic view showing, by way of example, a construction of a vehicle to which the present invention is applied.
FIG. 2 is a table indicating a combination of frictional coupling devices placed in engaged states to establish each of a plurality of gear positions in the automatic transmission of FIG. 1.

FIG. 1 is a schematic view showing a construction of an automatic transmission 12 of a vehicle 10, which is to be controlled by an electronic control device 60 serving as a control apparatus according to the present invention. This automatic transmission 12 is suitably used for an FF vehicle, and is installed in the lateral (transverse) direction of the vehicle 10. The automatic transmission 12 includes a first transmission portion 18 and a second transmission portion 24 which are disposed coaxially with each other on a common axis C and which are disposed in a transaxle casing 14 as a non-rotatable member that is attached to a body of the vehicle 10. The first transmission portion 18 is principally constituted by a first planetary gear set 16 of a single-pinion type, while the second transmission portion 24 is a transmission device of a Ravigneaux type which is principally constituted by a second planetary gear set 20 of a double-pinion type and a third planetary gear set 22 of a single-pinion type. The automatic transmission 12 further includes an input shaft 26 and an output shaft 27, such that a rotary motion of the input shaft 26 is transmitted to an output gear 28 that is fixed to the output shaft 27, at an established one of speed ratios. The input shaft 26 corresponds to an input member of the automatic transmission 12. In the present embodiment, the input shaft 26 is a turbine shaft of a torque converter 32 as a fluid transmission device that is rotated by a vehicle drive power source in the form of an engine 30. The output gear 28 corresponds to an output member of the automatic transmission 12, and functions as a counter drive gear for transmitting a drive force to a differential driven gear 34 shown in FIG. 3 in the present embodiment. An output of the engine 30 is transmitted to right and left drive wheels 38 via a power transmission device 11 including the above-described torque converter 32, automatic transmission 12 and differential gear device 34 and a pair of axles 36 (see FIG. 3). It is noted that a lower half of each of the above-described automatic transmission 12 and torque converter 32, which are constructed substantially symmetrically with respect to its axis C, is not shown in FIG. 1.

The torque converter 32 includes a pump impeller 32p connected to a crankshaft 31 of the engine 30, a turbine impeller 32t connected to the automatic transmission 12 through a turbine shaft (corresponding to the input shaft 26) of the torque converter 32, and a stator impeller 32s that is inhibited from being rotated in one direction by an one-way clutch, such that a drive force is transmitted between the pump impeller 32p and the turbine impeller 32t through a fluid. In the present embodiment, the pump impeller 32p corresponds to an input rotary member of the torque converter 32, and the turbine impeller 32t corresponds to an output rotary member of the torque converter 32, such that the drive force of the engine 30 is transmitted toward the automatic transmission 12 through a working oil as the fluid. The torque converter 32 further includes a lockup clutch 33 and a mechanical oil pump 46. The lockup clutch 33 is disposed between the pump impeller 32p and the turbine impeller 32t that correspond to the respective input and output rotary members of the torque converter 32, so as to be operable to directly connect between the pump impeller 32p and the turbine impeller 32t. The oil pump 46 is connected to the pump impeller 32p, and is to be driven by the engine 30 to generate a working fluid pressure that serves as a source pressure for controlling shifting of the automatic transmission 12, controlling operation of the lockup clutch 33 and supplying a lubricant oil to various parts. The lockup clutch 33, which is a well-known hydraulic friction clutch, is to be frictionally engaged with a front cover 32c of the torque converter 32, by a hydraulic control unit (hydraulic control circuit) 70 that controls a pressure difference $\Delta P$ (=PON−POFF) between a hydraulic pressure PON within an engaging hydraulic chamber 32on and a hydraulic pressure POFF within a releasing hydraulic chamber 32off.

The automatic transmission 12 has six forward-drive gear positions consisting of a first-gear position (1st) through a sixth-gear position (6th), and a reverse-drive gear position (R). The forward-drive and reverse-drive gear positions are established with respective different combinations of connections of rotary elements (sun gears S1-S3, carriers CA1-CA3 and ring gears R1-R3) of the first and second transmission portions 18 and 24. As indicated in table of FIG. 2, the first-gear position 1st is established with a clutch C1 and a brake B2 being placed in respective engaged states, the second-gear position 2nd is established with the clutch C1 and a brake B1 being placed in respective engaged states, the third-gear position 3rd is established with the clutch C1 and a brake B3 being placed in respective engaged states, the fourth-gear position 4th is established with the clutches C1 and C2 being placed in respective engaged states, the fifth-gear position 5th is established with the clutch C2 and the brake B3 being placed in respective engaged states, and the sixth-gear position 6th is established with the clutch C2 and the brake B1 being placed in respective engaged states. Further, the reverse-drive gear position R is established with the brakes B2 and B3 being placed in respective engaged states, and a neutral position N is established with all of the clutches C1 and C2 and the brakes B1-B3 being placed in respective released states.

The table of FIG. 2 shows operational states of the above-described clutches C1 and C2 and brakes B1-B3 as frictional coupling devices for establishing each of the plurality of gear positions in the automatic transmission 12, namely, a combination of the frictional coupling devices placed in engaged states to establish each of the plurality of gear positions. In the table, "○ (circle)" indicates the engaged state, and "□ (square)" indicates the engaged state for engine brake application. The brake B2 is not required to be necessarily placed in the engaged state when the vehicle is started (accelerated), since a one-way clutch F1 is disposed in parallel with the brake B2 which is placed in the engaged state to establish the first-gear position (1st). That is, only the engagement of the clutch C1 is required when the vehicle is started. For example, when it is returned from a neutral state, the clutch C1 is placed in the engaged state. Thus, the clutch C1 functions as a starting clutch. The gear positions GS have respective speed ratios γGS (=rotational speed NIN of the input shaft 26/rotational speed NOUT of the output shaft 28) that are determined by gear ratios ρ1, ρ2, and ρ3 of the first, second and third planetary gear sets 16, 20 and 22 (=number of teeth of the sun gear/number of teeth of the ring gear).

Each of the above-described clutches C1 and C2 and brakes B1-B3 (hereinafter referred to simply as "clutches C" and "brakes B", unless otherwise specified) is a clutch or brake of a multiple-disc type, or a hydraulically operated frictional coupling device which is selectively placed in the engaged or released state, by a hydraulic actuator controlled by a corresponding one of linear solenoid valves SL1-SL5 incorporated within the hydraulic control unit 70 (see FIG. 3). The linear solenoid valves SL1-SL5 are magnetized and demagnetized, and electric currents to be applied to these valves SL1-SL5 are controlled, to selectively place the respective coupling devices in the engaged or released states, and to regulate transient hydraulic pressures of the hydraulic actuators during engaging and releasing actions of the coupling devices.

Figure 3:
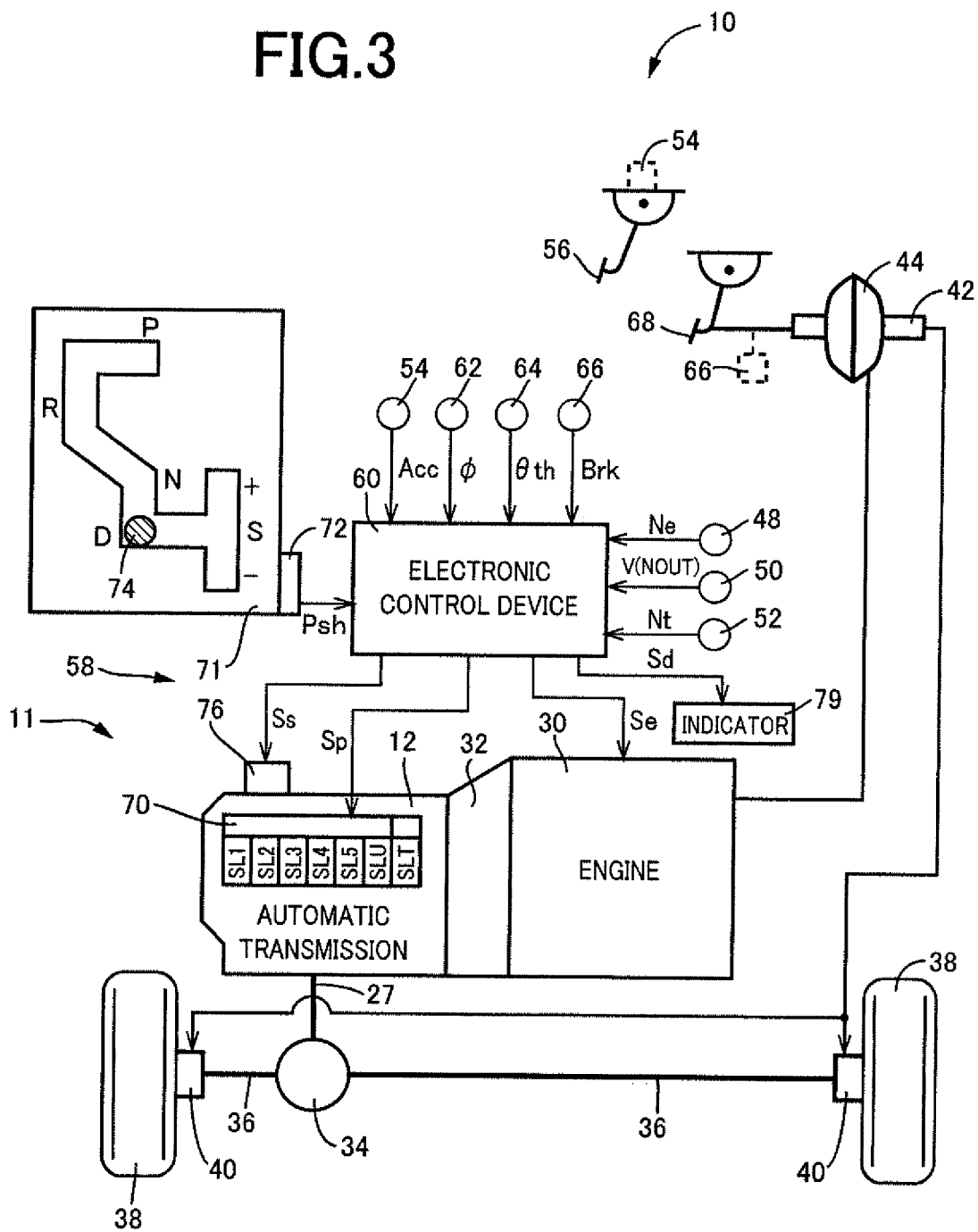
FIG. 3 is a block diagram showing major portions of an electric system provided in the vehicle for controlling various components such as the automatic transmission of FIG. 1.

FIG. 3 is a block diagram showing major portions of an electric system provided in the vehicle 10 for controlling various components such as the engine 30 and the automatic transmission 12. As shows in FIG. 3, the vehicle 10 is provided with the electronic control device 60 that corresponds to the control apparatus configured to perform various control operations such as a control operation that is to be performed in a case when an operator of the vehicle 10 selects an opposite-direction drive range for driving the vehicle 10 in a direction opposite to a current running direction of the vehicle 10, for example, during running of the vehicle 10 on a downhill road. The electronic control device 60 includes, for example, a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM.

The electronic control device 60 receives various input signals such as: an output signal indicative of an engine rotational speed Ne (rpm) which is a rotational speed of the engine 30 and which is detected by an engine speed sensor 48; an output signal indicative of an output rotational speed Nout (rpm) that is a rotational speed of the output gear 28 which corresponds to a vehicle running speed V and which is detected by a vehicle speed sensor 50; an output signal indicative of a turbine rotational speed Nt (rpm) which is a rotational speed of a turbine shaft of the torque converter 32 (i.e., an input rotational speed Nin that is a rotational speed of the input shaft 26) and which is detected by a turbine speed sensor 52; an output signal indicative of an accelerator opening degree Acc (%) which is an operating amount of an accelerator pedal 56 corresponding to a requested amount (operator's requested amount) requested to the vehicle 10 by the operator and which is detected by an accelerator sensor 54; an output signal indicative of a slope φ (degree) with respect to a longitudinal direction of the vehicle 10 and which is detected by a slope sensor 62; an output signal indicative of a throttle opening degree θth which is an opening degree of an electronic throttle valve and which is detected by a throttle sensor 64; an output signal Brk indicative of an operation of a brake pedal 68 which is an operation (depressing operation amount) of a foot brake as a service brake and which is detected by a brake sensor 66, and an output signal Psh indicative of a shift position (shift-lever operating position) of a shift lever 74 of a shift operation device 71, which is detected by a shift position sensor 72. In the present embodiment, the output signal Brk indicative of the depressing operation amount that is an amount of operation of the brake pedal 68, is supplied to the electronic control device 60. However, an output signal Bon indicating that an operation is made to the brake pedal 68 may be supplied to the electronic control device 60.

The electronic control device 60 generates various output signals such as engine-output-control command signals Se for controlling an output of the engine 30, hydraulic-pressure-control command signals Sp for controlling shifting of the automatic transmission 12, shift command signals Ss for controlling switching of a sift range (drive range), and indication command signals Sd for causing an indicator 79 to indicate messages. The engine-output-control command signals Se, which are outputted to the engine 30, include: drive signals that are supplied to a throttle actuator so as to open and close the electronic throttle valve in accordance with the above-described accelerator opening degree Acc; injection signals for controlling an amount of fuel injected from a fuel injection device; and ignition timing signals for controlling timing of ignition of the engine 30 by an igniter. The hydraulic-pressure-control command signals Sp, which are outputted to the hydraulic control unit 70, include: valve-control command signals (hydraulic-pressure command signals, hydraulic-pressure command values and drive signals) for controlling magnetization and demagnetization of linear solenoid valves SL1-SL5 included in the hydraulic control unit 70 for shifting the gear position in the automatic transmission 12; and hydraulic-pressure command signals for controlling engagement and release of the lockup clutch 33. The shift command signals Ss are outputted to the shift actuator 76. The indication command signals Sd are outputted to the indicator 79.

The shift lever 74 of the shift operation device 71 is disposed near an operator's seat in the vehicle 10, and is operable to be placed in a selected one of five shift-lever operating positions that consist of, for example, "P" position, "R" position, "N" position, "D" position and "S" position, as shown in FIG. 3.

The "P" position is a parking position for releasing a power transmitting path in the automatic transmission 12, namely, establishing a neutral state in which power transmission in the automatic transmission 12 is interrupted, and also for mechanically inhibiting (locking) of rotation of the output gear 28 by a mechanical parking mechanism (that is constituted by a parking-locking device 106 described below). The "R" position is a reverse drive position for inverting the rotating direction of the output gear 28 of the automatic transmission 12. The "N" position is a neutral position for establishing the neutral state in which the power transmission in the automatic transmission 12 is interrupted. The "D" position is a forward drive position for executing an automatic shift control using all of the forward-drive gear positions (consisting of the first gear position 1st through the sixth gear position 6th), namely, executing an automatic shift control within a forward drive range (D range) within which the shifting of the automatic transmission 12 is allowed. The "S" position is a forward drive position in which manual shifting can be made by manually switching among a plurality of various gear ranges, wherein the lowest-speed gear position and the highest-speed gear position are defined in each of the various gear ranges such that the various gear ranges are different from one another in the highest-speed gear position.

Thus, the "D" position is the shift position for selecting an automatic shifting mode that is a control mode in which an automatic shift control is executed within the forward drive range within which the shifting of the automatic transmission 12 is allowed, namely, within which the range of the first gear position 1st through the sixth gear position 6th that are shown in FIG. 2, for example. The "S" position is the shift position for selecting a manual shifting mode that is a control mode in which a manual shift control is executed for allowing the operator to select one of the various gear ranges (that are different from one another with respect to the highest-speed gear position) by his or her manual operation and also an automatic shift control is executed within the forward drive range within which the shifting of the automatic transmission 12 is allowed, namely, within the lowest-speed gear position and the highest-speed gear position that are defined in the selected one of the various gear ranges.

Each of the wheels 38 is provided with a wheel brake 40 in which a braking force is generated based on a brake operating force (depressing force) applied to the brake pedal 68 that is operatively depressed by the operator. The brake operating force corresponds to a requested braking amount. In the present embodiment, a brake hydraulic pressure corresponding to the brake operating force is mechanically generated in a brake master cylinder 42, and a braking force is generated based on the brake hydraulic pressure. A brake booster 44 is provided to boost the brake operating force by utilizing a vacuum pressure generated by rotation of the engine 30, so that the brake hydraulic pressure outputted from the brake master cylinder 44 is boosted whereby the braking force can be increased.

Figure 4:
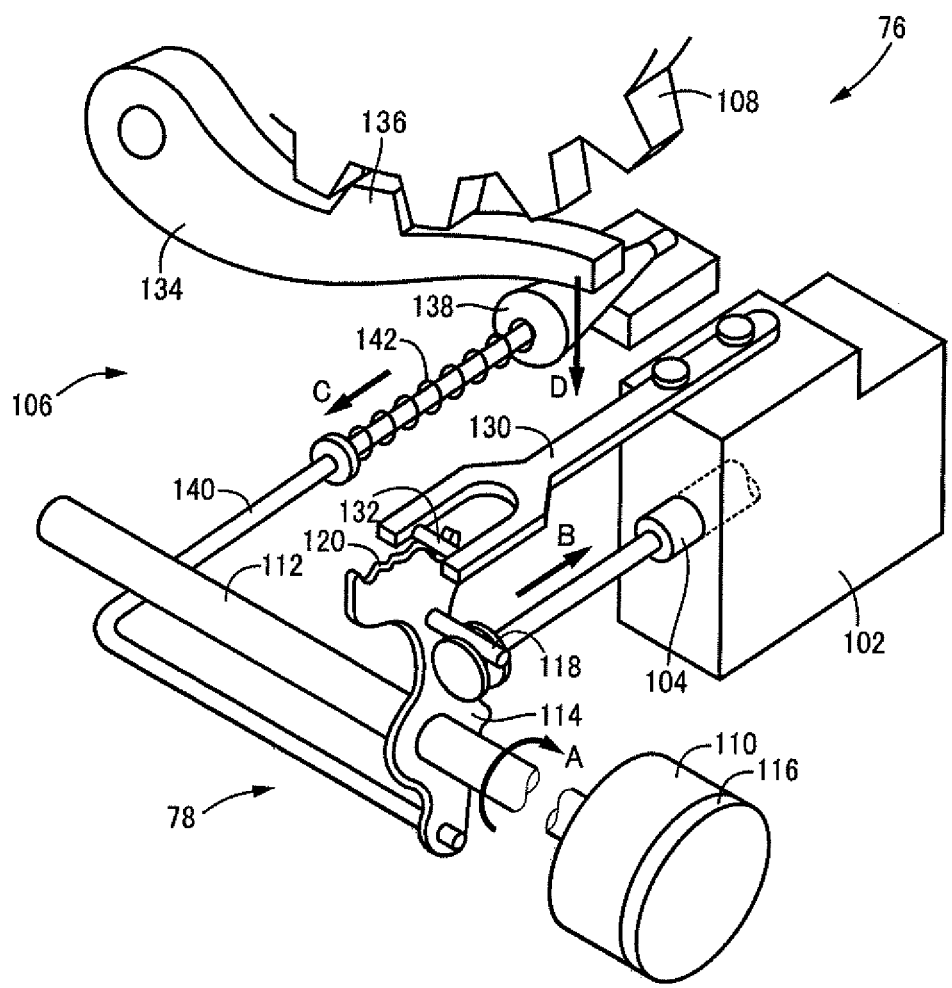
FIG. 4 is a perspective view showing a construction of a shift actuator that is configured to switch a shift range in the automatic transmission of FIG. 1.

FIG. 4 is a perspective view showing a construction of a shift actuator 76 including a shift-range switching device 78 configured to switch the shift range established in the automatic transmission 12 and a parking-locking device 106 configured to lock the output shaft 27 of the automatic transmission 12 for making the output shaft 27 unrotatable. The shift actuator 76 cooperates with the shift operation device 71 and a shift-by-wire electronic control unit (hereinafter referred to as "SBW-ECU") 80 to constitute a shifting device 58 (see FIG. 3) that serves as a shift-by-wire system that is configured to establish the shift range based on an output signal Psh supplied from the shift operation device 71 such that the established shift range correspond to the shift position (shift-lever operating position) of the shift lever 74.

The shift-range switching device 78 includes: a stepper motor 110 that is to be operated based on an electric signal in the form of the output signal Psh outputted in response to a switching operation made in the shift operation device 71 shown in FIG. 3; a manual shaft 112 that is connected to an output shaft of the stepper motor 110 through, for example, a speed reducer, and a detent plate 114 that is fixedly mounted on the manual shaft 112 and is engaged with a spool valve element 104 that is axially movable to be positioned in one of a plurality of predetermined positions.

The detent plate 114 is pivoted, about its pivot center corresponding to an axis of the manual shaft 112, with rotation of the manual shaft 112, and is positioned in one of a plurality of pivot positions that correspond to the respective predetermined positions of the spool valve element 104 which are predetermined to correspond to the respective shift ranges. An operating position of the stepper motor 110, i.e., an angular position of a rotor of the stepper motor 110 is detected by a rotary encoder 116.

Figure 5:
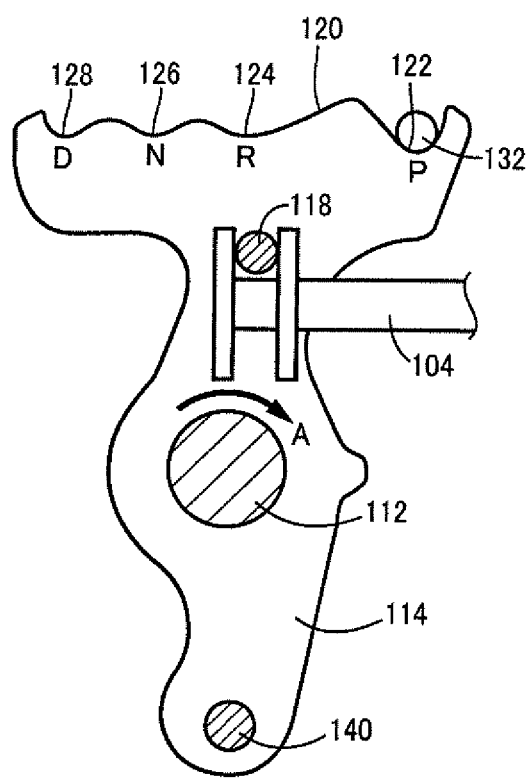
FIG. 5 is a view of a detent plate as seen in a direction of an axis of a manual shaft that is shown in FIG. 4.

FIG. 5 is a view of the detent plate 114 as seen in a direction of the axis of the manual shaft 112. As shown in FIGS. 4 and 5, the detent plate 114 has a spool-valve-element engaging rod 118 that projects, in a direction of thickness of the detent plate 114, from a portion of a side surface which is distant from the pivot center, such that the spool-valve-element engaging rod 118 is engaged with the spool valve element 104 in an axial direction (movement direction) of the spool valve element 104. When the detent plate 114 is pivoted, about the pivot center corresponding to the axis of the manual shaft 112, to one of the pivot positions, the spool valve element 104 is axially moved owing to the engagement of the spool-valve-element engaging rod 118 with the spool valve element 104, so as to be positioned in one of the plurality of predetermined positions that corresponds to the above-descried one of the pivot positions.

The detent plate 114 has a cam surface 120 which is provided by a portion of its outer circumferential surface, and which has a contour so as to have a function of positioning the spool valve element 104 in one of the plurality of predetermined positions. As shown in detail in FIG. 5, in the cam surface 120 provided by the portion of the outer circumferential surface of the detent plate 114, i.e., an upper end portion of the detent plate 114 (as seen in FIG. 5), there are provided a first recessed portion 122, a second recessed portion 124, a third recessed portion 126 and a fourth recessed portion 128. The first recessed portion 122 is provided to position the spool valve element 104 in one of the plurality of predetermined positions which corresponds to P range (parking range) as one of the shift ranges. The second recessed portion 124 is provided to position the spool valve element 104 in one of the plurality of predetermined positions which corresponds to R range (reverse drive range) as one of the shift ranges. The third recessed portion 126 is provided to position the spool valve element 104 in one of the plurality of predetermined positions which corresponds to N range (neutral range) as one of the shift ranges. The fourth recessed portion 128 is provided to position the spool valve element 104 in one of the plurality of predetermined positions which corresponds to D range (forward drive range) as one of the shift ranges. An engaging roller (cam follower roller) 132 is rotatably held in a distal end portion of a leaf spring 130 that is fixed at its proximal end portion of a body of the manual valve 102. The engaging roller 132 is forced, by a pressing force of the leaf spring 130, against the cam surface 120, so that the engaging roller 132 can be engaged in one of the first through fourth recessed portions 122, 124, 126, 128 of the cam surface 120. With engagement of the engaging roller 132 in one of the recessed portions 122, the detent plate 114 is positioned in a corresponding one of the pivot positions whereby the spool valve element 104 is positioned in a corresponding one of the predetermined positions that correspond to the respective shift ranges.

The parking-locking device 106 includes a parking gear 108, a parking lock pawl 134, a parking rod 140 and a coil spring 142. The parking gear 108 is connected to the output shaft 27 (see FIGS. 1 and 3) of the automatic transmission 12. The parking lock pawl 134 has a pawl portion 136, which is moved toward and away from the parking gear 108 when the parking lock pawl 134 is pivoted about its pivot axis, and which is caused to mesh with the parking gear 108 when the pawl portion 136 is moved toward the parking gear 108. With the pawl portion 136 meshing with the parking gear 108, the output shaft 27 is held unrotatable. The parking rod 140 supports, at one of its opposite end portions, a tapered member 138 that is engaged at its tapered circumferential surface with the parking lock pawl 134. The one of the opposite end portions of the parking rod 140 is introduced in an hole provided in one of axially opposite end faces of the tapered member 138 which one has a larger diameter than the other of the axially opposite end faces. The coil spring 142 is mounted on the parking rod 140 and forces the tapered member 138 in a direction away from the parking rod 140, i.e., in a direction away from the above-described one of the axially end faces toward the above-described other of the axially opposite end faces. The parking rod 140 is connected, at the other of the above-described opposite end portions, to a lower end portion of the detent plate 114 (as seen in FIG. 5), so that the taper member 138 is axially moved in the direction away from the parking rod 140 or in a direction toward the parking rod 140 as the detent plate 114 is pivoted.

FIG. 4 shows a state in which the detent plate 114 is positioned in one of the pivot positions that corresponds to the P range. In this state, the spool valve element 104 of the manual valve 102 is positioned in one of the predetermined positions that corresponds to the P range, while the pawl portion 136 of the parking lock pawl 134 meshes with the parking gear 108 whereby the rotation of the output shaft 27 is inhibited. When the manual shaft 112 is rotated, from this state, in a direction of arrow A shown in FIG. 4 by operation of the stepper motor 110, the spool valve element 104 is axially moved in a direction indicated by arrow B to be positioned in another one of the predetermined positions that corresponds to another shift range, and the above-described one of the opposite end portions of the parking rod 140 is moved in a direction of arrow C and accordingly the taper member 138 (that is mounted on a distal end of the one of the opposite end portions of the parking rod 140) is also moved in the direction of arrow C whereby the parking lock pawl 134 is moved in a direction of arrow D. With the movement of the parking lock pawl 134 in the direction of arrow D, the pawl portion 136 is moved away from the parking gear 108 to a position in which the pawl portion 136 does not mesh with the parking gear 108 whereby the lock of the output shaft 27 is released.

Figure 6:
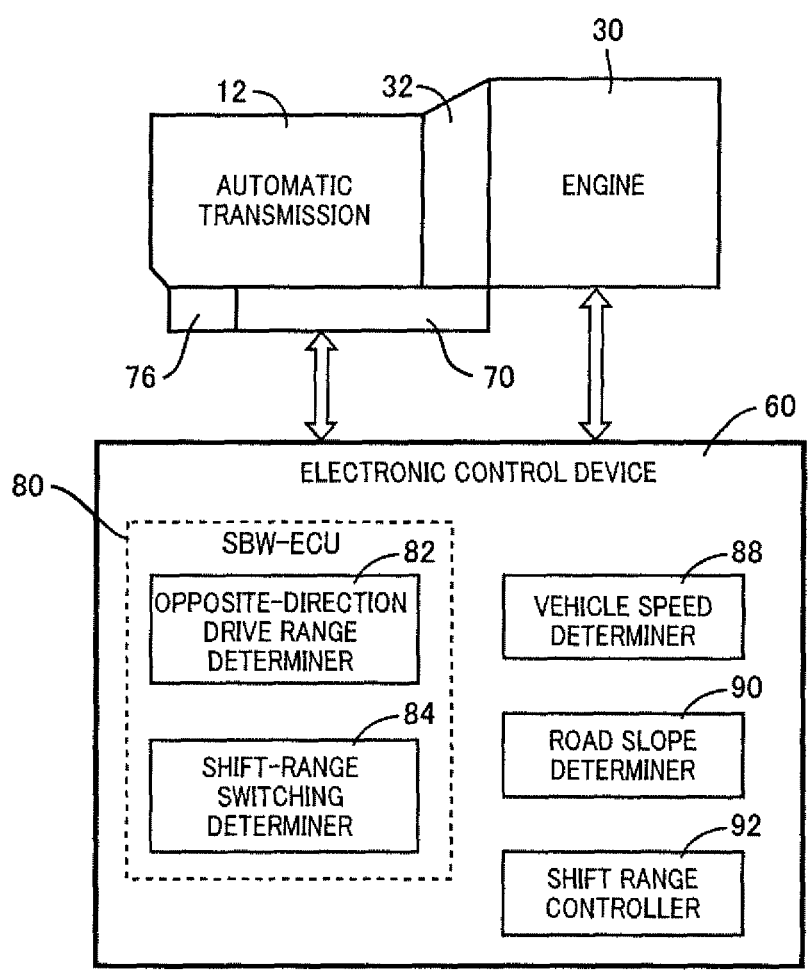
FIG. 6 is a functional block diagram showing major control functions and control portions of an electronic control device that is shown in FIG. 3.

FIG. 6 is a functional block diagram showing major control functions and control portions of the electronic control device 60 that includes an opposite-direction drive range determiner 82, a shift-range switching determiner 84, a vehicle speed determiner 88, a road slope determiner 90 and a shift range controller 92. The opposite-direction drive range determiner 82 and the shift-range switching determiner 84, which are surrounded by broken line in FIG. 6, are included in the SBW-ECU (shift-by-wire electronic control unit) 80 so as to constitute respective functional portions of the SBW-ECU 80. The SBW-ECU 80 is configured to determine the shift position (shift-lever operating position) of the shift lever 74, based on the output signal Psh supplied from the shift position sensor 72, and also to select an appropriate shift range even when the shift lever 74 is inappropriately operated by the operator.

Figure 10A:
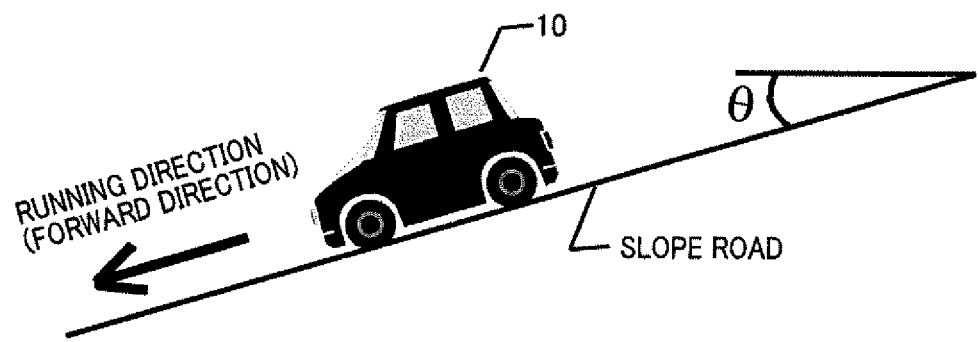
FIG. 10A is a view showing, by way of example, a case in which it is interpreted that the vehicle is running on a downhill road.
Figure 10B:
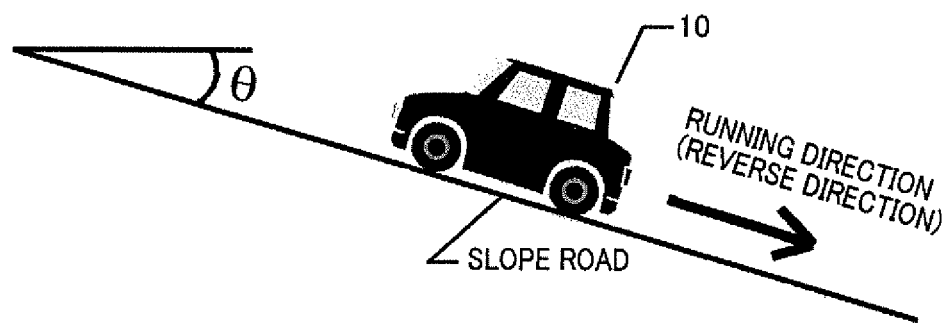
FIG. 10B is a view showing, by way of example, another case in which it is interpreted that the vehicle is running on a downhill road.

The vehicle speed determiner 88 determines whether the vehicle running speed V, i.e., the rotational speed NOUT of the output shaft 28 that is detected by the vehicle speed sensor 50, is equal to or higher than a threshold value (given value) Va. The threshold value Va is a value of the vehicle running speed V, which provides a torque whose magnitude is not so large to cause stall of the engine 30 even if an opposite-direction drive range (i.e., a drive range for driving the vehicle 10 in a direction opposite to a current running direction of the vehicle 10) is selected and switching to the opposite-direction drive range is made during running of the vehicle 10 on a flat road, and which is not so low to make the operator feel inconvenience, for example, in a so-called "going back and forth" because an upper limit speed value allowing the switching between the D range and the R range is too low. The threshold value Va is set to about 15 km/h, for example. The vehicle speed determiner 88 determines also the current running direction in which the vehicle 10 is currently running. The road slope determiner 90 makes determinations based on a signal representing a slope (gradient) $\varphi$ of the road in the longitudinal direction (i.e., running direction) of the vehicle 10, which is detected by the slope sensor 62, wherein one of the determinations is as to whether an absolute value of the slope $\varphi$ is equal to or larger than a predetermined value $\varphi a$ and the other determination is as to whether the road is downhill or uphill in the running direction of the vehicle 10. The slope sensor 62 is constituted by, for example, a G-sensor or an inclinometer, and detects a road-surface inclination angle $\theta road$ or a slope $\varphi$ (=tan $\theta road$), wherein an inclination angle of a horizontal direction is treated as 0 (zero). The vehicle speed determiner 88 generates a signal indicating that the vehicle running speed V is not lower than the threshold value Va, and the road slope determiner 90 generates a signal indicating that the road is a downhill road having the slope $\varphi$ that is a positive value whose absolute value is not smaller than the predetermined value $\varphi a$, or is an uphill road having the slope $\varphi$ that is a negative value whose absolute value is not smaller than the predetermined value $\varphi a$. The signals generated by the vehicle speed determiner 88 and the road slope determiner 90 are supplied to the SBW-ECU 80. It is noted that it is determined that the road is downhill in the running direction of the vehicle 10, for example, not only a case shown in FIG. 10A but also a case shown in FIG. 10B. In the case of FIG. 10A, a front portion of the slop road, which is located on a front side of the vehicle 10, is located on a lower side of a rear portion of the slope road, which is located on a rear side of the vehicle 10. Meanwhile, in the case of FIG. 10B, a front portion of the slop road, which is located on a front side of the vehicle 10, is located on an upper side of a rear portion of the slope road, which is located on a rear side of the vehicle 10. However, in the case of FIG. 10B, the vehicle 10 is running in the reverse direction, so that, as viewed in the running direction, a front portion of the slope road is located on a lower side of a rear portion of the slope road. Therefore, in the case of FIG. 10B, as well as in the case of FIG. 10A, it is interpreted that the vehicle 10 is running on an downhill road.

When the vehicle running speed V is equal to or higher than the threshold value Va, and when the road is downhill in the running direction of the vehicle 10 with the absolute value of the slope $\varphi$ being equal to or larger than the predetermined value $\varphi a$ (even if the vehicle running speed V is lower than the threshold value Va), the SBW-ECU 80 does not allow switching to the opposite-direction drive range (for driving the vehicle 10 in a direction opposite to a current running direction of the vehicle 10) even if an operation requesting switching to the opposite-direction drive range is made. That is, when the opposite-direction drive range determiner 82 determines that the shift range, to which the switching operation was made, is the opposite-direction drive range, the shift-range switching determiner 84 inhibits the switching to the opposite-direction drive range as long as the vehicle running speed V is equal to or higher than the threshold value Va or as long as the road is downhill in the running direction of the vehicle 10 with the absolute value of the slope $\varphi$ being equal to or larger than the predetermined value $\varphi a$ (even if the vehicle running speed V is lower than the threshold value Va).

On the other hand, when the vehicle running speed V is lower than the threshold value Va during running of the vehicle 10 on a flat road with the absolute value of the slope $\varphi$ with respect to the current running direction of the vehicle 10 being smaller than the predetermined value $\varphi a$, and when the vehicle running speed V is lower than the threshold value Va during running of the vehicle 10 on an uphill road with the absolute value of the slope $\varphi$ with respect to the current running direction of the vehicle 10 being equal to or larger than the predetermined value $\varphi a$, the SBW-ECU 80 allows switching to the opposite-direction drive range. That is, when the opposite-direction drive range determiner 82 determines that the shift range selected by the switching operation corresponds to the opposite-direction drive range, the shift-range switching determiner 84 allows the switching to the opposite-direction drive range, if the vehicle running speed V is lower than the threshold value Va during running of the vehicle 10 on a flat road with the absolute value of the slope $\varphi$ being smaller than the predetermined value $\varphi a$, or if the vehicle running speed V is lower than the threshold value Va during running of the vehicle 10 on an uphill road with the absolute value of the slope $\varphi$ being equal to or larger than the predetermined value $\varphi a$.

Figure 7:
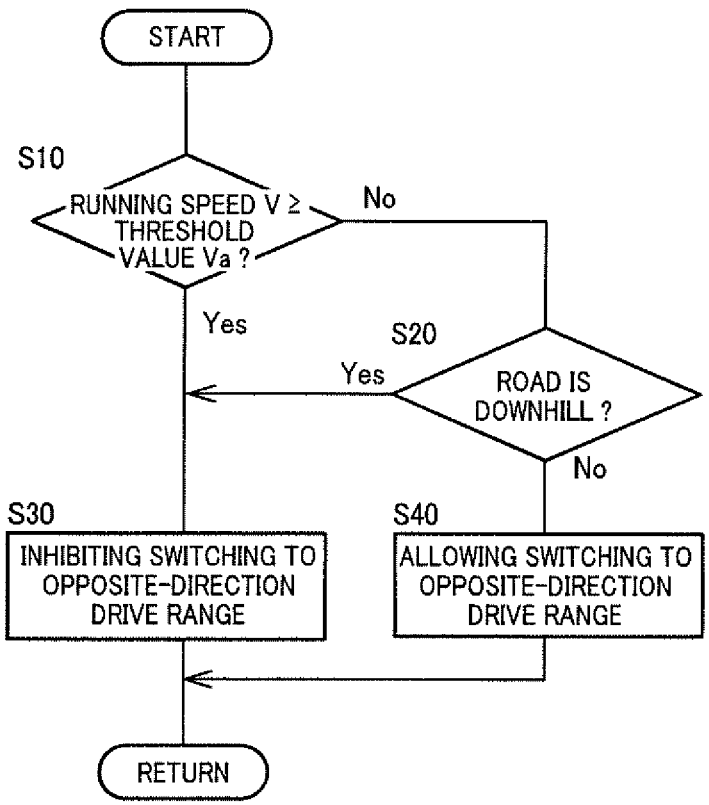
FIG. 7 is a flow chart showing a major portion of a control routine executed by the electronic control device shown in FIG. 6, namely, a control operation that is executed in case of selection of an opposite-direction drive range for driving the vehicle in a direction opposite to a current running direction of the vehicle during running of the vehicle on a downhill road.

FIG. 7 is a flow chart showing, by way of example, a control routine that is executed by the electronic control device 60 when the operator selects an opposite-direction drive range for driving the vehicle 10 in a direction opposite to a current running direction of the vehicle 10 during running of the vehicle on a downhill road with the slope $\varphi$ being a positive value not smaller than the predetermined value $\varphi a$. The control routine is initiated with step S10 (hereinafter simply referred to "S10" as well as the other steps) corresponding to function of the vehicle speed determiner 88, which is implemented to determine whether the vehicle running speed V is equal to or higher than the threshold value Va. When a negative determination (No) is made at S10, the control flow goes to S20 corresponding to function of the road slope determiner 90, which is implemented to determine whether the road (on which the vehicle 10 runs) is a downhill road having a slope $\varphi$ (with respect to the current running direction of the vehicle 10) whose absolute value is equal to or larger than the predetermined value $\varphi a$. The control flow goes to S30 corresponding to functions of the opposite-direction drive range determiner 82 and the shift-range switching determiner 84, when a positive determination (Yes) is made at S20, (namely, when it is determined that the road is the downhill road,) and when a positive determination (Yes) is made at S10 (namely, when it is determined that the vehicle running speed V is not lower than the threshold value Va). S30 is implemented to inhibit switching to the shift range, which is selected by the operator, from being actually executed, if the shift range selected by the operator corresponds to the opposite-direction drive range. When a negative determination (No) is made at S20, (namely, when it is not determined that the road is the downhill road,) the control flow goes to S40 corresponding to functions of the opposite-direction drive range determiner 82 and the shift-range switching determiner 84 so that the switching to the shift range selected by the operator is allowed and is actually executed, even if the selected shift range corresponds to the opposite-direction drive range (namely, irrespective of whether the selected shift range corresponds to the opposite-direction drive range or not).

According to the present embodiment, the vehicle 10 is provided with the automatic transmission 12 having the plurality of shift ranges and the shifting device 58 including the shift actuator 76 and the shift lever 74, wherein the shift actuator 76 is configured to establish one of the shift ranges in the automatic transmission 12 such that the established one of the shift ranges corresponds to one of the plurality of shift-lever operating positions of the shift lever 74, which is operatively selected by the vehicle operator. When the switching request is made by the operator to request the automatic transmission 12 to be switched to the opposite-direction drive range for driving the vehicle in a direction opposite to a current running direction of the vehicle during running of the vehicle 10 with a speed V being not lower than the threshold value (given value) Va, the electronic control device 60 is configured to reject the switching request requesting the automatic transmission 12 to be switched to the opposite-direction drive range. Further, the electronic control device 60 is configured, during running of the vehicle 10 on a downhill road, to reject the switching request requesting the automatic transmission 12 to be switched to the opposite-direction drive range even if the running speed V of the vehicle 10 is lower than the threshold value Va, whereby occurrence of an engine stall can be retrained. Thus, it is possible to avoid a situation in which the vehicle 10 cannot be stopped easily, due to reduction of a vacuum pressure in an intake of the engine 30 by stop of the engine 30, which reduction leads to reduction of a force which is generated by the brake booster 44 using the vacuum pressure and which assists a brake pedal force (i.e., force applied onto the brake pedal 68). Further, it is possible to avoid impairment of the operational convenience, which could be caused in an arrangement in which more speed limitation is imposed on the shift range switching between the forward drive range and the reverse drive range, for example, in "going back and forth" even during running on a flat road.

There will be described another embodiment of this invention. The same reference signs as used in the above-described first embodiment will be used in the following embodiment, to identify the functionally corresponding elements.

Second Embodiment

In the above-described first embodiment, in the vehicle 10 is provided with the automatic transmission 12 and the shifting device 58 configured to establish a shift range in the automatic transmission 12 by operation of the shift actuator 76, such that the established shift range corresponds to the shift-lever operating position of the shift lever 74, the switching request requesting the automatic transmission 12 to be switched to the opposite-direction drive range (for driving the vehicle 10 in a direction opposite to the current running direction) is rejected in a case when the vehicle running speed V is not lower than the threshold value (given value) Va and also in a case when the vehicle 10 runs on a downhill road even if the running speed V of the vehicle is lower than the threshold value Va. In the second embodiment, in either of the above-described cases, in addition to the rejection of the switching request requesting switching to the opposite-direction drive range, the shift range established before the switching operation is maintained without the established shift range being switched to the other shift range, or is switched to the N range or P range. Specifically, when one of the D range and R range as the shift range before the switching operation, the one of the D range and R range is maintained or switched to the N range. When the N range has been established as the shift range before the switching operation, the N range is maintained or is switched to the P range. It is noted that the second embodiment is the same as the above-described first embodiment that is shown in FIG. 7, in that the switching to the opposite-direction drive range is allowed in a case when the vehicle running speed V is lower than the threshold value Va during running of the vehicle 10 on a flat road with the absolute value of the slope φ being smaller than the predetermined value φa, (rather than on a downhill road with the absolute value of the slope φ being not smaller than the predetermined value φa,) or during running of the vehicle 10 on an uphill road with the absolute value of the slope φ being not smaller than the predetermined value φa.

In a case when the vehicle running speed V is not lower than the threshold value Va, and in a case when the vehicle running speed V is lower than the threshold value Va but the road is a downhill road having a slope φ whose absolute value is not smaller than the predetermined value φa, if the switching operation for selecting the opposite-direction drive range (such as an operation for selecting the "R" position during a forward running and an operation for selecting the "D" position during a reverse running) is made by the operator, the SBW-ECU 80 inhibits switching to the opposite-direction drive range, for preventing the engine stall. In this instance, specifically, the SBW-ECU 80 maintains the shift range that has been established before the switching operation or switches the shift range to the N range, and at the same time, causes the indicator (display) 79 to indicate a message saying that "ENGINE STALL POSSIBLY OCCURS. FOR SWITCHING OPERATE ONCE AGAIN AFTER STOPPING CAR" or "SWITCHED TO N RANGE DUE TO POSSIBLE ENGINE STALL. FOR SWITCHING, OPERATE ONCE AGAIN AFTER STOPPING CAR." Further, in addition to the indication of the message by the indicator 79, a voice message saying the same content may be provided. If the switching operation is made in the shift operation device 71 again after stop of the vehicle 10, the SBW-ECU 80 allows the switching to the opposite-direction drive range in accordance with the switching operation made again.

Further, in a case when the vehicle running speed V is not lower than the threshold value Va, and in a case when the vehicle running speed V is lower than the threshold value Va but the road is a downhill road having a slope φ whose absolute value is not smaller than the predetermined value φa, if the switching operation for selecting the opposite-direction drive range (such as an operation requesting switching from the "N" position to the "R" position during a forward running on a downhill road and an operation requesting switching from the "N" position to the "D" position during a reverse running on a downhill road) is made by the operator, the SBW-ECU 80 inhibits switching to the opposite-direction drive range, for preventing the engine stall. In this instance, specifically, the SBW-ECU 80 switches the shift range to the P range or maintains the N range that has been established before the switching operation, and at the same time, causes the indicator (display) 79 to indicate a message saying that "SWITCHED TO P RANGE DUE TO POSSIBLE ENGINE STALL. FOR SWITCHING, OPERATE ONCE AGAIN." or "ENGINE STALL POSSIBLY OCCURS. FOR SWITCHING, OPERATE ONCE AGAIN." Further, in addition to the indication of the message by the indicator 79, a voice message saying the same content may be provided. If the switching operation is made in the shift operation device 71 again after the switching to the opposite-direction drive range has been inhibited, the SBW-ECU 80 allows the switching to the opposite-direction drive range in accordance with the switching operation made again.

Figure 8:
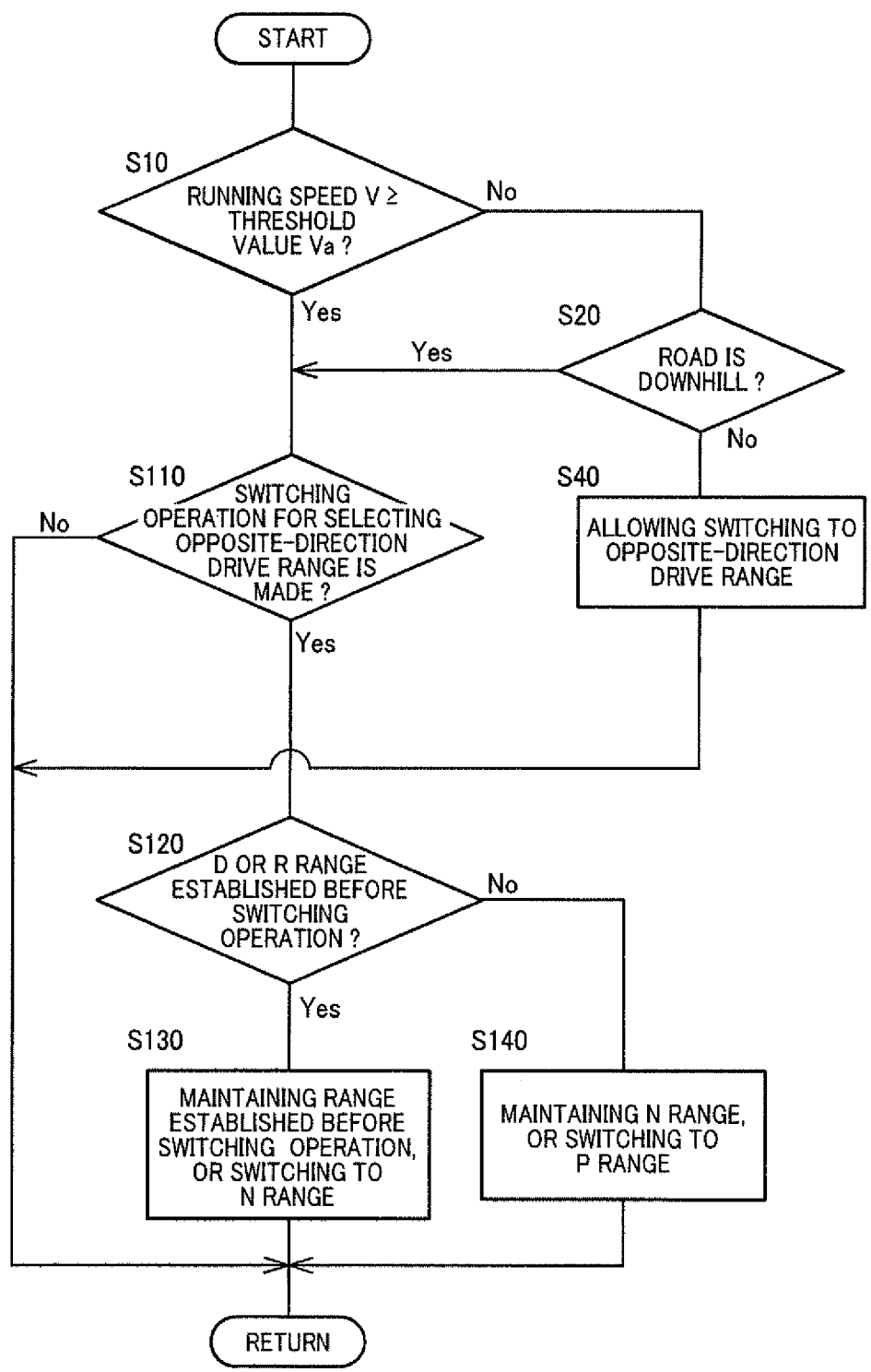
FIG. 8 is a flow chart showing a major portion of a control routine or operation executed according to another embodiment of the invention, in case of selection of the opposite-direction drive range during running of the vehicle on a downhill road, wherein a shift range is established based on a shift range established before an operation is made for the selection of the opposite-direction drive range.

FIG. 8 is a flow chart showing, by way of another example, a control routine that is executed by the electronic control device 60 when the operator makes the switching operation for selecting the opposite-direction drive range. This control routine is executed to determine the shift range that is to be established, based on the shift range that has been established before the switching operation. This control routine shown in the flow chart of the FIG. 8 is the same as the control routine shown in the flow chart of FIG. 7 in terms of the step S10, S20 and S40, but different in terms of steps S110 to S140 which replace the step S30 that is implemented to inhibit switching to the shift range, which is selected by the operator, from being actually executed, if the shift range selected by the operator corresponds to the opposite-direction drive range. Therefore, hereinafter, the steps S110 to S140 will be described.

At S110 corresponding to function of the opposite-direction drive range determiner 82, it is determined whether the switching operation for selecting the opposite-direction drive range (such as (i) an operation requesting switching from the "D" position to the "R" position during a forward running, (ii) an operation requesting switching from the "R" position to the "D" position during a reverse running, (iii) an operation requesting switching from the "N" position to the "R" position during a forward running, and (iv) an operation requesting switching from the "N" position to the "D" position during a reverse running) has been made. When a negative determination (No) is made at S110, one cycle of execution of the control routine is terminated, and the control routine is again initiated with S10. When a positive determination (Yes) is made at S110, S120 corresponding to function of the shift-range switching determiner 84 is implemented to determine whether the shift range established before the switching operation is either the D range or R range. When a positive determination (Yes) is made at S120, namely, when it is determined that the shift range established before the switching operation is the D range or R range, S130 corresponding to functions of the shift-range switching determiner 84 and the shift range controller 92 is implemented to inhibit the switching to the opposite-direction drive range, by maintaining the D range or R range that is the shift range established before the switching operation requesting the opposite-direction drive range to be established, or alternatively, by switching from the D range or R range to the N range (in place of maintaining the D range or R range).

Further, at S130, the indicator 79 is caused to indicate a message saying that "ENGINE STALL POSSIBLY OCCURS. FOR SWITCHING, OPERATE ONCE AGAIN AFTER STOPPING CAR." in an arrangement in which the D range or R range is maintained, or a message saying that "SWITCHED TO N RANGE DUE TO POSSIBLE ENGINE STALL. FOR SWITCHING, OPERATE ONCE AGAIN AFTER STOPPING CAR." in an arrangement in which the D range or R range is switched to the N range. Further, in addition to the indication of the message by the indicator 79, a voice message saying the same content may be provided. If the switching operation is made again after stop of the vehicle 10, the switching to the opposite-direction drive range in accordance with the switching operation made again is allowed. When a negative determination (No) is made at S120, namely, when it is determined that the shift range established before the switching operation is the N range, S140 corresponding to functions of the shift-range switching determiner 84 and the shift range controller 92 is implemented to inhibit the switching to the opposite-direction drive range, by maintaining the N range that is the shift range established before the switching operation requesting the opposite-direction drive range to be established, or alternatively, by switching from the N range to the P range (in place of maintaining the N range).

Further, at S140, the indicator 79 is caused to indicate a message saying that "ENGINE STALL POSSIBLY OCCURS. FOR SWITCHING, OPERATE ONCE AGAIN." in an arrangement in which the N range is maintained, or a message saying that "SWITCHED TO P RANGE DUE TO POSSIBLE ENGINE STALL. FOR SWITCHING, OPERATE ONCE AGAIN. in an arrangement in which the N range is switched to the P range. Further, in addition to the indication of the message by the indicator 79, a voice message saying the same content may be provided. If the switching operation for the opposite-direction drive range is made again after the switching to the opposite-direction drive range has been inhibited, the switching to the opposite-direction drive range in accordance with the switching operation made again is allowed.

According to the second embodiment, the operations as described above make it possible to avoid occurrence of the stall of the engine 30 and accordingly to stop the vehicle 10 easily. That is, it is possible to avoid a situation in which the vehicle 10 cannot be stopped easily, due to reduction of a vacuum pressure in an intake of the engine 30 by stop of the engine 30, which reduction leads to reduction of a force which is generated by the brake booster 44 using the vacuum pressure and which assists a brake pedal force (i.e., force applied to depress the brake pedal 68). Further, it is possible to avoid the operational convenience from being impaired, unlike in an arrangement in which the above-described threshold value Va is reduced for inhibiting the shift range switching even at a lower running speed of the vehicle 10 for preventing the engine stall also on a downhill road, and in which the operational convenience is likely to be impaired, for example, in "going back and forth", because of more limitation on the shift range switching between the forward drive range and the reverse drive range even on a flat road.

Further, according to the second embodiment, by implementation of S130, after inhibiting the switching request requesting the automatic transmission 12 to be switched to the opposite-direction drive range, the electronic control device 60 allows the automatic transmission 12 to be switched to the opposite-direction drive range if the vehicle 10 has been stopped, and informs, by a character display, for example, the operator that (i) there is a possibility of stall of the engine 30 if the automatic transmission 12 is switched to the opposite-direction drive range, and that (ii) the automatic transmission 12 is allowed to be switched to the opposite-direction drive range after the vehicle is stopped. Thus, it is possible to avoid occurrence of the engine stall, and accordingly to stop the vehicle 10 easily by ensuring the force which is generated by the brake booster 44 and which assists the force applied to the brake pedal 68. Further, in a case when the operator's selection of the opposite-direction drive range is made by an erroneous operation, it is possible to facilitate the operator to take appropriate measures. Further, according to the second embodiment, by implementation of S140, after inhibiting the switching request requesting the automatic transmission 12 to be switched to the opposite-direction drive range, the electronic control device 60 allows the automatic transmission 12 to be switched to the opposite-direction drive range if the switching request has been made again by the operator, and informs, by a character display, for example, the operator that (i) there is a possibility of stall of the engine 30 if the automatic transmission 12 is switched to the opposite-direction drive range, and that (ii) the automatic transmission 12 is allowed to be switched to the opposite-direction drive range if the switching request is made again by the operator. Thus, it is possible to avoid occurrence of the engine stall, and accordingly to stop the vehicle 10 easily by ensuring the force which is generated by the brake booster 44 and which assists the force applied to the brake pedal 68. Further, in a case when the operator's selection of the opposite-direction drive range is made by an erroneous operation, it is possible to facilitate the operator to take appropriate measures.

In the above-described first and second embodiments, the shift-lever operating positions of the shift lever 74 includes the "S" position. However, the shift-lever operating positions may include "M" position in place of the "S" position. Further, the shift-lever operating positions may not include these "S" and "M" positions for selecting the manual shifting mode that is not essential.

There will be described still another embodiment of this invention. The same reference signs as used in the above-described embodiments will be used in the following embodiment, to identify the functionally corresponding elements.

Third Embodiment

Figure 9:
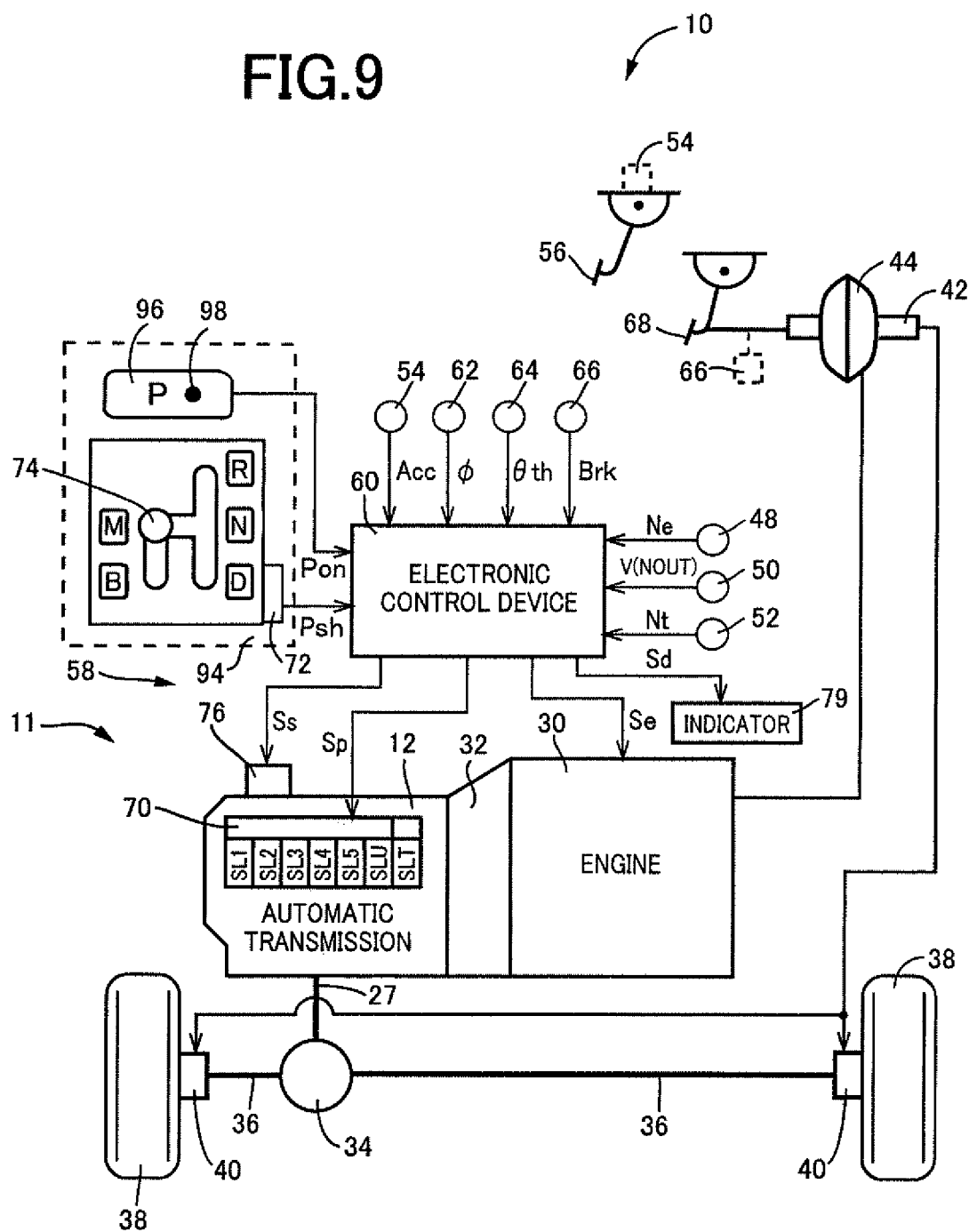
FIG. 9 is a block diagram block diagram showing major portions of an electric system provided in the vehicle, wherein a momentary-type shift operation device is provided in place of an alternate-type shift operation device that is shown in FIG. 3.

In the above-described embodiments, the shift operation device 71 shown in FIG. 3 is of alternate type in which the shift lever 74 is kept in one of the shift-lever operating positions after an operator's operation for placing the shift lever 74 in the one of the shift-lever operating positions. However, the shift operation device 71 is may be replaced by a momentary-type shift operation device 94, as shown in FIG. 9, in which the shift lever 74 is automatically returned to a predetermined home position after the shift lever 74 is released from operation by the operator. In an example shown in FIG. 9, the shift operation device 94, which is defined by broken line, is constituted by the shift lever 74 and a P switch 96. The shift operation device 94 is disposed near the operator's seat, and is provided with the shift lever 74 of momentary type, which is to be practically or functionally placed in a selected one of the plurality of shift-lever operating positions. That is, in the shift operation device 94, the shift lever 74 is practically or functionally placed in a selected one of the shift-lever operating positions, which is selected based on operator's operations applied to operating members such as the shift lever 74 and the P switch 96, and which is not necessarily coincident with an actual physical position of the shift lever 74.

The P switch 96 is a push button switch of momentary type, for example, and is configured, each time when being pushed by an user such as the vehicle operator, to generate a P switch signal Pon that is supplied to the electronic control device 60. For example, when the P switch 96 is pushed while one of the shift-lever operating positions, which is other than the "P" position, of the shift lever 74 is being selected, the shift lever 74 is practically or functionally placed in the "P" position by the electronic control device 60, as long as the vehicle 10 is substantially stopped or other certain condition is satisfied. The "P" position is a parking position for realizing a parking lock for mechanically inhibiting of rotation of the drive wheels 24 by the parking-locking device 106. The P switch 96 is provided with a P-position indicator ramp 98 built therein, such that the P-position indicator ramp 98 is turned on when the shift lever 74 is practically or functionally placed in the "P" position as one of the shift-lever operating positions.

In the third embodiment, too, substantially the same control operations are executed as in the above-described first and second embodiments, which make it possible to avoid occurrence of the stall of the engine 30 and accordingly to stop the vehicle 10 easily. That is, it is possible to avoid a situation in which the vehicle 10 cannot be stopped easily, due to reduction of a vacuum pressure in an intake of the engine 30 by stop of the engine 30, which reduction leads to reduction of a force which is generated by the brake booster 44 using the vacuum pressure and which assists a brake pedal force (i.e., force applied to depress the brake pedal 68). Further, it is possible to avoid the operational convenience from being impaired, unlike in an arrangement in which the above-described threshold value Va is reduced for inhibiting the shift range switching even at a lower running speed of the vehicle 10 for preventing the engine stall also on a downhill road, and in which the operational convenience is likely to be impaired, for example, in "going back and forth", because of more limitation on the shift range switching between the forward drive range and the reverse drive range even on a flat road.

While the embodiments of the present invention have been described above, it is to be understood that the present invention may be embodied otherwise.

While the torque converter 32 and the automatic transmission 12 are used in the above-described embodiments, the torque converter 32 may not be used. Further, while the automatic transmission 12 is constituted by a multi-stage transmission in the above-described embodiments, the transmission 12 may be constituted by, in place of the multi-stage transmission, a belt-type continuously variable transmission having a transmitting belt mounted on a pair of variable pulleys.

It is to be understood that the embodiments described above are given for illustrative purpose only, and that the present invention may be embodied with various modifications and improvements which may occur to those skilled in the art.

NOMENCLATURE OF ELEMENTS

10: Vehicle
12: Automatic transmission
58: Shifting device
60: Electronic control device (Control apparatus)
74: Shift lever
76: Shift actuator
D, R, N: shift ranges

What is claimed is:

1. A control apparatus for a vehicle that is provided with (a) an automatic transmission having a plurality of shift ranges and (b) a shifting device including (b-1) a shift actuator and (b-2) a shift lever, wherein
the shift actuator is configured to establish one of the shift ranges in the automatic transmission such that the established one of the shift ranges corresponds to a selected one of a plurality of shift-lever operating positions of the shift lever, when a switching request is made by an operator of the vehicle to request the automatic transmission to be switched to an opposite-direction drive range as one of the shift ranges which is for driving the vehicle in a direction opposite to a current running direction of the vehicle, during running of the vehicle with a running speed being not lower than a given value, said control apparatus is configured to reject the switching request requesting the automatic transmission to be switched to the opposite-direction drive range, said control apparatus is configured to reject the switching request requesting the automatic transmission to be switched to the opposite-direction drive range, also during running of the vehicle with the running speed being lower than the given value, if the vehicle is running on a downhill road.

2. The control apparatus according to claim 1, wherein the plurality of shift ranges of the automatic transmission includes at least a forward drive range, a reverse drive range and a neutral range, and when rejecting the switching request requesting the automatic transmission to be switched to the opposite-direction drive range from one of the forward drive range and the reverse drive range, which is established for running the vehicle in the current running direction, said control apparatus is configured to cause the shift actuator to maintain said one of the forward drive range and the reverse drive range, or to cause the shift actuator to establish the neutral range.

3. The control apparatus according to claim 1, wherein the plurality of shift ranges of the automatic transmission includes at least a neutral range and a parking range, and when rejecting the switching request requesting the automatic transmission to be switched to the opposite-direction drive range from the neutral range that is established for running the vehicle in the current running direction, said control apparatus is configured to cause the shift actuator to maintain the neutral range, or to cause the shift actuator to establish the parking range.

4. The control apparatus according to claim 2, wherein after rejecting the switching request requesting the automatic transmission to be switched to the opposite-direction drive range during running of the vehicle on the downhill road with the running speed being lower than the given value, said control apparatus is configured to inform the operator of the vehicle that (i) there is a possibility of an engine stall of the vehicle if the automatic transmission is switched to the opposite-direction drive range, and that (ii) the automatic transmission is allowed to be switched to the opposite-direction drive range after the vehicle is stopped.

5. The control apparatus according to claim 3, wherein after rejecting the switching request requesting the automatic transmission to be switched to the opposite-direction drive range during running of the vehicle on the downhill road with the running speed being lower than the given value, said control apparatus is configured to allow the switching request if the switching request is made again by the operator, and to inform that (i) there is a possibility of an engine stall of the vehicle if the automatic transmission is switched to the opposite-direction drive range, and that (ii) the automatic transmission is allowed to be switched to the opposite-direction drive range if the switching request is made again by the operator.

6. The control apparatus according to claim 1, wherein the switching request requesting the automatic transmission to be switched to the opposite-direction drive range is made by selection of one of the plurality of shift-lever operating positions of the shift lever by the operator, said one of the plurality of shift-lever operating positions corresponding to the opposite-direction drive range, and when rejecting the switching request requesting the automatic transmission to be switched to the opposite-direction drive range, said control apparatus is configured to inhibit the shift actuator from establishing the opposite-direction drive range in the automatic transmission.

7. The control apparatus according to claim 1, wherein the vehicle further includes: a vehicle speed sensor configured to detect the running speed of the vehicle; and a slope sensor configured to detect a slope of a road on which the vehicle is currently running, said control apparatus comprising:

a vehicle speed determiner configured to determine whether the running speed detected by the vehicle speed sensor is not lower than the given value, and to determine the current running direction of the vehicle;

a road slope determiner configured to determine whether the road is downhill with an absolute value of the slope being not smaller than a predetermined value, based on the current running direction determined by said vehicle speed determiner and the slope detected by the slope sensor;

an opposite-direction drive range determiner configured, when the switching request is made by the operator, to determine whether the switching request requests the automatic transmission to be switched to the opposite-direction drive range; and a shift-range switching determiner configured to reject the switching request (i) when it is determined by said opposite-direction drive range determiner and said vehicle speed determiner that the switching request requests the automatic transmission to be switched to the opposite-direction drive range and that the running speed is not lower than the given value, and (ii) when it is determined by said opposite-direction drive range determiner and said road slope determiner that the switching request requests the automatic transmission to be switched to the opposite-direction drive range and that the road is downhill with the absolute value of the slope being not smaller than the predetermined value.

* * * * *